United States Patent

[11] 3,613,492

| [72] | Inventor | Lars Olof Anton Soderkvist<br>Vallingby, Sweden |
|---|---|---|
| [21] | Appl. No. | 833,546 |
| [22] | Filed | June 16, 1969 |
| [45] | Patented | Oct. 19, 1971 |
| [73] | Assignee | LKB-Produkter AB<br>Bromma, Sweden |
| [32] | Priority | July 2, 1968 |
| [33] | | Sweden |
| [31] | | 9129/1968 |

[54] MICROTOME
6 Claims, 3 Drawing Figs.

[52] U.S. Cl. ..................................................... 83/170,
83/915.5
[51] Int. Cl. ........................................................ B26d 7/10
[50] Field of Search ............................................ 83/170,
915.5, 410, 411, 401

[56] References Cited
UNITED STATES PATENTS
2,651,236  10/1953  Kahler ........................... 83/170 X
2,753,761   9/1956  Hillier ........................... 83/170
2,927,505  10/1960  Haanstra ........................ 83/170 X
3,077,806   2/1963  Hellstrom ....................... 83/915.5 X
3,487,739   1/1970  Murphy et al. .................. 83/915.5 X

*Primary Examiner*—Andrew R. Juhasz
*Assistant Examiner*—James F. Coan
*Attorney*—McGlew and Toren ABSTRACT: A microtome comprises a holder for a specimen to be cut, a knife for cutting the specimen, a means to impart the holder with a cutting movement in relation to the knife, and a means to impart the holder with a feeding movement in relation to the knife. The feeding means consists of an expansion body provided with a heating means. A thermostat is arranged on the expansion body to regulate the power supplied to the heating means. This regulated supply of power to the heating means makes it possible for the expansion body to maintain a constant temperature, so that the expansion body neither expands nor contracts.

PATENTED OCT 19 1971 3,613,492

INVENTOR
Lars Olof Anton Söderkvist by
*McGlew & Toren*
ATTORNEYS.

MICROTOME

BACKGROUND AND SUMMARY OF THE INVENTION

The invention relates to a microtome, particularly a so-called ultramicrotome for cutting extremely thin sections or cuttings, for example down to a thickness of about $10^{15}$ mm. The microtome is of the type comprising a holder for an object or specimen to be cut, a knife for cutting the specimen, and a means to impart the holder with a feeding movement in relation to the knife, the feeding means constituting an expansion body provided with a heating means.

In known microtomes of this type the feeding takes place continuously since the expansion body is continuously heated and thus expands continuously. If the interval between two cutting operations is maintained constant, sections of the same thickness are obtained. If, however, the cutting is interrupted, for example to study the sections obtained, the expansion body may continue to expand even if the supply of heat is interrupted since the heating means does not instantaneously cease to emit heat. An important part of the specimen to be cut may therefore be wasted.

The invention aims at providing a microtome in which the feeding movement is completely under control so that, at a temporary interruption in cutting, the expansion body remains in its position, neither expanding nor contracting. After the interruption it is then possible to continue cutting with the same thickness of the sections and without any portion of the specimen being wasted.

The microtome according to the invention is characterized in that a thermostat is arranged on the expansion body to regulate the power supplied to the heating means so that the expansion body can be given a constant temperature at which the feeding movement ceases. By using a sufficiently sensitive thermostat the power supplied can be exactly regulated so that the expansion body neither expands nor contracts. Such a thermostat may, for example, consist of a resistance wire, arranged on the expansion body, having a resistance dependent on the temperature, the resistance wire being substantially uniformly placed over the surface of the expansion body so that the resultant resistance corresponds to the average temperature of the expansion body. The resistance wire thus preferably forms a branch in a resistance bridge, the output signal of which is arranged to regulate the power to the heating means, which preferably is in the form of an electric resistance, for example an incandescent lamp.

The expansion body is preferably constructed as a separate part to which a specimen arm is attached so that the specimen arm can be given a cutting movement. The specimen to be cut is attached to the free end of the specimen arm. Alternatively, the expansion body and the specimen arm may be combined to form a unit so that the specimen arm carries out both the cutting and the feeding movement. Alternatively, the expansion body may be arranged to transfer the feeding movement to the knife, while the specimen arm is arranged to carry out only the cutting movement.

BRIEF DESCRIPTION OF THE DRAWINGS

The invention will be further described with reference to the accompanying drawings.

DESCRIPTION OF THE PREFERRED EMBODIMENT

Figure 1:
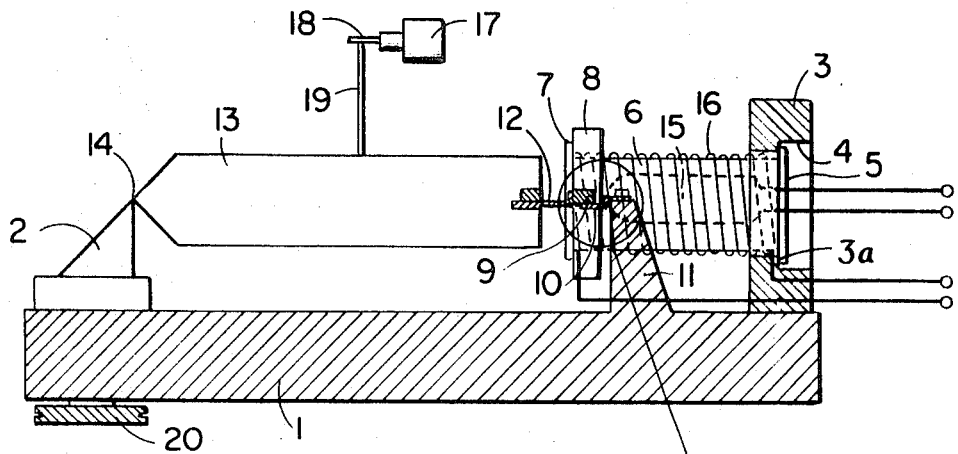
FIG. 1 shows an embodiment of the microtome according to the invention.

The microtome according to FIG. 1 includes a knife 2, known per se, attached on a base 1. The base also carries a vertically positioned annular holder 3. This holder 3 is provided with a recess or notch 4 having a diameter which is larger than the diameter of the central opening in the annular holder. In this way a vertical, annular surface 3a is formed which is situated in the vertical central plane of the annular holder. On this annular surface 3a a plate 5 is attached onto which is attached an expansion body in the form of a relatively thin-walled, metallic cylinder 6 extending horizontally through the opening in the annular holder 3. At the other end of the cylinder 6 is a plate 7 which is attached to the end surface of a second annular holder 8, the cylinder 6 extending through the opening of this second holder. The annular holder 8 is provided with two diametrically oppositely situated pegs 9. To each peg 9 is attached one end of a leaf-spring 10 which is bent to form two right angles. The other end of the leaf-spring 10 is attached to a part 11 projecting from the stand 1.

Inside the hollow expansion body 6 is a heating means in the form of an incandescent lamp 15. On the surface of the expansion body 6 a resistance wire 16 is wound, the turns of the wire being evenly distributed over the surface. The electrical connection between the incandescent lamp 15 and the resistance wire 16 will be explained with reference to FIG. 2.

To each peg 9 one end of a leaf-spring 12 is attached, the other end being attached to one end of a specimen arm 13, the other end of the arm carrying the specimen 14 which is to be cut with the help of the knife 2. In order to reduce the expansion of the specimen arm 13 due to the heat from the incandescent lamp 15, the specimen arm 13 and the leaf-springs 10 and 12 are suitably made of a material having low thermal conductivity and a low coefficient of thermal expansion, for example the iron-nickel alloy known as "Invar." If desired, insulating material may be applied around the expansion body.

The cutting movement of the specimen arm 13 is effected with the help of an electric motor 17 which rotates alternately in one direction and in the reverse direction. The motor drives a horizontal shaft 18 at low speed. On the shaft 18 a cord 19 is attached, the other end being attached to the specimen arm 13. When the shaft 18 is turned, the specimen arm 13 will be alternately lifted by the cord 19 and lowered by its own weight so that the specimen is moved past the cutting edge of the knife 2 and cutting takes place. The cord 19 is always vertical since it is only wound a part of a whole turn around the shaft 18. If it is wound further the specimen arm will alter position laterally, which is not desirable. During the upward movement of the specimen arm 13 the knife 2 is held back by a retraction magnet 20 which influences the base 1. This retraction movement is carried out in conjunction with the movement of the specimen arm as described in detail in Swedish Pat. No. 180,777.

Figure 2:
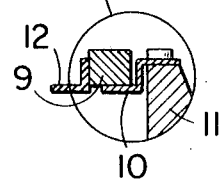
FIG. 2 shows the electric circuit for the thermostat and the heating means in the microtome according to FIG. 1.
Figure 2:
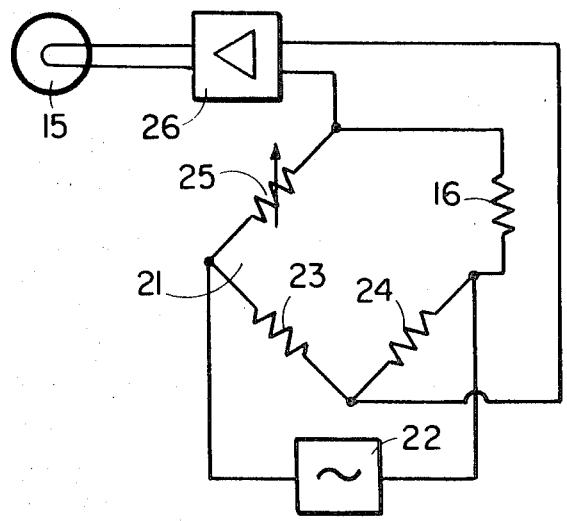

FIG. 2 shows the electric circuit between the incandescent lamp 15 and the resistance wire 16. The circuit contains a bridge 21 which is fed by an alternating current source 22 and contains two stationary resistors 23 and 24 and an adjustable resistance 25. The fourth branch of the bridge consists of the resistance wire 16. The incandescent lamp 15 is connected to the bridge via an amplifier 26.

Figure 3:
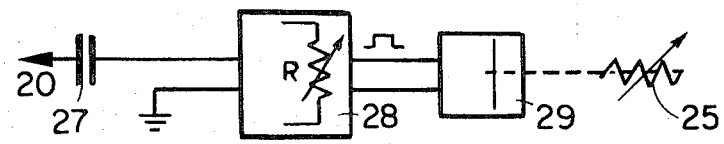
FIG. 3 shows the means for automatic and stepwise feeding of the specimen arm in the microtome according to FIG. 1.

FIG. 3 shows an example of how the stepwise and automatic feeding of the specimen arm 13 can take place by altering the adjustable resistor 25.

As the adjustable resistor 25, a 10-turn potentiometer can be used, which is turned by a motor 29 with a gearbox. The motor 29 is fed by a monostable multivibrator 28 having adjustable pulse length. The pulse length can be regulated by a resistor R (R is, consequently, feedsetting). The multivibrator is influenced by a capacitor 27. The function is as follows:

When the specimen arm 13 has reached its lowermost position (point of return) the retraction magnet 20 receives the current pulse required to induce the retraction. When this retraction pulse is over and the magnetic field disappears, a so-called spiked pulse is induced in the coil in the magnet 20. This spiked pulse triggers the multivibrator 28 via the capacitor 27 so that the multivibrator switches to its unstable position and remains there as long as the time constant of the capacitor 27 permits, after which it returns to its stable position. The motor 29 receives driving current only when the multivibrator 28 is in its unstable position and the potentiometer 25 is turned a distance depending on the pulse length from the multivibrator 28.

The microtome illustrated in the drawings operates in the following manner:

When the expansion body 6 is in a state of equilibrium, i.e., neither expanding nor contracting, it receives from the incandescent lamp 15 the same amount of heat as it emits to the surroundings. The output signal from the bridge 21 to the amplifier 26 is, consequently, of exactly the magnitude required to supply the power to the incandescent lamp 15 which corresponds to this state of equilibrium. When cutting takes place and the specimen arm 13 reaches its lower turning-point, the adjustable resistor 25 will be altered, for example as has been described above in connection with FIG. 3. Due to this increased resistance in the resistor 25 the value of the output signal from the bridge 21 to the amplifier 26 will increase and the incandescent lamp 15 will consequently be fed with a higher power. This results in a higher temperature in the expansion body and consequently in an elongation of this latter, namely exactly the elongation corresponding to the desired thickness of the sections. The temperature of the resistance wire 16 will increase to a corresponding extent, with the result that its resistance increases. This increased resistance causes the value of the output signal from the bridge 21 to the amplifier 26 to decrease. The bridge 21 becomes set in such a position that the incandescent lamp 15 obtains a somewhat higher power than before, which is necessary because the increased length of the expansion body corresponds to a higher temperature and causes a greater heat loss to the surroundings.

During the cutting the specimen 14 must not reach the edge of the knife 2 before the feeding movement is completed. By designing the expansion body and the heating means so as to have a low weight, the heating, the expansion and the adjustment to equilibrium can take place extremely rapidly, that is within a few seconds.

The heating of the expansion body also results in a heating of the annular holder 3. This heating results in the holder 3 expanding both upwardly, which does not affect the cutting to any noticeable extent, and in the feeding direction. Because the plate 5 is attached in the vertical central plane of the holder 3 the influence of this expansion in the feeding direction is avoided as far as the cutting operation is concerned.

In connection with the drawings a stepwise and automatic feeding has been described. It is also within the scope of the invention to perform the feeding in some other way, for example by a manual increase of the resistance of the resistor 25 for each cutting operation, or by a continuous increase in said resistance, for example with help of a separate motor. It also lies within the scope of the invention to use various types of radiation sources and not only incandescent lamps for the heat source.

What is claimed is:

1. A microtome comprising a holder for a specimen to be cut, a knife for cutting the specimen, a means to impart the holder with a cutting movement in relation to the knife, a means to impart the holder with a feeding movement in relation to the knife, the feeding means constituting an expansion body provided with a heating means, characterized in, that a thermic resistor is arranged on the expansion body, said resistor forming one branch in an impedance bridge also containing a controllable impedance, and said heating means being connected to the bridge so as to be regulated from the output voltage of said bridge, the expansion body thereby being given a constant temperature which is dependent on the value of said controllable impedance.

2. Microtome comprising a holder for a specimen to be cut, a knife for cutting the specimen, a means to impart the holder with a cutting movement in relation to the knife, and a means to impart the holder with a feeding movement in relation to the knife, the feeding means constituting an expansion body provided with a heating means, characterized in that a thermostat is arranged on the expansion body to regulate the power supplied to the heating means, so that the expansion body can be given a constant temperature at which the feeding movement ceases; the thermostat comprising a resistance wire arranged on the expansion body, the resistance wire having a resistance dependent on the temperature, the resistance wire being substantially uniformly placed on the surface of the expansion body so that the resultant resistance corresponds to the average temperature of the expansion body.

3. Microtome according to claim 2, characterized in that the resistance wire forms a branch in a resistance bridge, the output signal of which is arranged to regulate the power to the heating means.

4. Microtome according to claim 3, characterized in that the resistance bridge contains a controllable resistance by which the equilibrium temperature of the expansion body can be regulated.

5. Microtome according to claim 2, characterized in that the expansion body is designed as a tube around which the resistance wire is wound and in which the heating means is placed.

6. Microtome according to claim 5, characterized in that the heating means consists of a source of heat radiation.